United States Patent Office.

ANDREW G. SHADE AND GEORGE H. MOORE, OF VERONA, PENNSYLVANIA.

PAINT-OIL FROM PETROLEUM ACID RESIDUES.

SPECIFICATION forming part of Letters Patent No. 230,898, dated August 10, 1880.

Application filed January 8, 1880.

*To all whom it may concern:*

Be it known that we, ANDREW G. SHADE and GEORGE HENRY MOORE, both of Verona, in the county of Allegheny and State of Pennsylvania, have invented a new and useful Improvement in the Manufacture of Paint and Paint-Oils; and we do hereby declare the following to be a full, clear, and exact description thereof.

Our invention has for its object the manufacture of paint and paint-oils from the acid-tar or residuum from the refining of distilled oils; and it consists in the composition formed by treating or mixing with the residuum, first, water to remove the acid; second, alkalies to saponify the fatty matter of the residuum and remove all traces of the acid; third, rosin to give the matter body and consistency; and, fourth, turpentine to remove the offensive smell of the residuum.

We will now proceed to describe our invention, so that others skilled in the art may manufacture and use the same.

In the usual process of distilling and refining petroleum the petroleum is placed in a suitable still, heat is applied to drive over the vaporizable matter into a worm or other suitable condenser, and the hydrocarbons thus condensed, or the distillate, is then treated with acid in a vessel termed an "agitator." After the distillate has been treated with the acid and decanted or drawn from the agitator there will remain in the agitator a residuum consisting of a mixture of oily matter, coloring-matter, and acid; and it is this residuum that we utilize for the purposes of our invention. This residuum, as it comes from the oil-refining process, contains a certain quantity of acid, which must be removed. This may be done by mixing with the residuum a sufficient quantity of water, with which the acid unites, leaving the residuum comparatively free. The product thus obtained is what is known as "residuum from the acid-restoring process." After the acid has been removed the residuum is placed in a kettle or other suitable vessel, with water and alkalies in about the following proportions by weight: water, one-fifth part; lime, one-fifth part; caustic soda, one-eighth part. This mixture is boiled until the fatty matter of the residuum has become saponified and the uncombined water has been evaporated—say, about from four to five hours. When this point has been reached add to the mixture about one-tenth part by weight of rosin, and boil the mixture until all the rosin is melted, which will take about half an hour. The mixture is then allowed to cool; after which there is added to it about a one-eighth part by weight of turpentine. This mixture is boiled from half an hour to an hour, or until the rank smell of the residuum has been substantially removed.

The product which results from the foregoing process is about the consistency of what is known in the trade as "white lead," and is designed to be used as the base or body of paints, in the same manner as white lead, by mixing with it paint-oil and coloring-matter. This base is of a reddish-brown color, but may be made of a lighter color by using a greater quantity of alkali in the process hereinbefore described.

In order to manufacture paint-oil the base or body which is the result of the foregoing process is mixed with sufficient turpentine or benzine to reduce it to the necessary degree of fluidity.

In the foregoing specification we have named a certain proportion and quantity of the ingredients used as well suited to the process; but we do not wish to confine ourselves to these proportions, as a different quantity and proportion may be used instead.

We are aware that in the preparation of paint-oils from the acid residuum of a distillate the acid residuum has been washed with water to remove the major portion of the acid, and the decanted oily matters treated with an alkali to neutralize the remaining acid, and that in conjunction with such a process a moderate heat has been applied by means of steam or otherwise. We are also aware that a somewhat similar acid residuum has been washed for the removal of acid, then mixed with an alkali and water, and boiled or distilled to drive off the water, after which the contents of the vessel were allowed to settle and the supernatant liquid decanted and used as a paint-oil; and we do not herein claim either of said processes for the preparation of a paint-oil from the acid residuum of a distillate; but we are not aware that, in addition to the steps above recited, the addition of rosin and turpentine in manner and form as hereinbefore set forth has been practiced, and as such steps are material in the production of our composition, not only as improving the color and quality of the product, but also in freeing it from objectionable odors; therefore,

Having thus described our invention, what we claim, and desire to secure by Letters Patent, is—

As a new article of manufacture, the composition of matter hereinbefore described, consisting of the neutralized saponified residuum of acid tar compounded with rosin and turpentine, as a base for paint and paint-oils, substantially as described.

In testimony whereof we, the said ANDREW G. SHADE and GEORGE HENRY MOORE, have hereunto set our hands.

ANDREW G. SHADE.
   GEORGE H. MOORE.

Witnesses:
 FRANK W. SMITH,
 JAMES K. BAKEWELL.